United States Patent
Gentry (10) Patent No.: US 9,858,822 B1
(45) Date of Patent: *Jan. 2, 2018

(54) AIRSPACE ACTIVITY TRACKING USING UNMANNED AERIAL VEHICLES

(71) Applicant: Amazon Technologies, Inc., Seattle, WA (US)

(72) Inventor: Nicholas Kristofer Gentry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/478,075

(22) Filed: Apr. 3, 2017

Related U.S. Application Data (63) Continuation of application No. 14/633,900, filed on Feb. 27, 2015, now Pat. No. 9,646,502.

(51) Int. Cl.
| | | |
|---|---|---|
| *G08G 5/04* | (2006.01) | |
| *G08G 5/00* | (2006.01) | |
| *B64C 39/02* | (2006.01) | |
| *H04W 84/18* | (2009.01) | |

(52) U.S. Cl.
CPC ......... *G08G 5/0008* (2013.01); *B64C 39/024* (2013.01); *G08G 5/0039* (2013.01); *G08G 5/0069* (2013.01); *H04W 84/18* (2013.01)

(58) Field of Classification Search
CPC .... G08G 5/045; G08G 5/0039; G08G 5/0069; G08G 5/008; H04W 24/02; H04W 84/18; B64C 39/024
See application file for complete search history.

(56) References Cited

U.S. PATENT DOCUMENTS

| | | | |
|---|---|---|---|
| 5,890,079 A | * | 3/1999 | Levine ............... B64F 5/00 340/961 |
| 8,437,956 B2 | | 5/2013 | Limbaugh et al. |
| 8,838,289 B2 | | 9/2014 | Margolin |
| 2012/0092208 A1 | | 4/2012 | LeMire et al. |
| 2013/0026285 A1 | | 1/2013 | Otto |

\* cited by examiner

*Primary Examiner* — Richard M Camby
(74) *Attorney, Agent, or Firm* — Lee & Hayes, PLLC (57) ABSTRACT

This disclosure is directed to an automated unmanned aerial vehicle ("UAV") self-identification system, devices, and techniques pertaining to the automated identification of individual UAVs operating within an airspace via a mesh communication network, individual UAVs and a central authority representing nodes of the mesh network. The system may detect nearby UAVs present within a UAV's airspace. Nearby UAVs may self-identify or be identified via correlation with one or more features detected by the UAV. The UAV may validate identifying information using a dynamic validation policy. Data collected by the UAV may be stored in a local mesh database and distributed to individual nodes of the mesh network and merged into a common central mesh database for distribution to individual nodes of the mesh network. UAVs on the mesh network utilize local and central mesh database information for self-identification and to maintain a dynamic flight plan.

20 Claims, 7 Drawing Sheets

AIRSPACE ACTIVITY TRACKING USING UNMANNED AERIAL VEHICLES

CROSS-REFERENCE TO RELATED APPLICATION

This application is a continuation application of and claims the benefit and priority to U.S. patent application Ser. No. 14/633,900, titled, "Universal Unmanned Aerial Vehicle Identification System", filed on Feb. 27, 2015, the entire disclosure of which is incorporated herein by reference.

BACKGROUND

Unmanned Aerial Vehicle (UAV) activity has become increasingly common in airspace around the world. The increase in activity is driven by many types of users, including noncommercial-type entities (i.e., hobbyists, etc.), commercial-type entities (i.e., aerial photography, surveying, etc.), and military entities. Generally UAVs operate at low altitudes where air traffic is busiest and most unpredictable. For example, take-off and landing of commercial aircraft, test flights, private pilot activity, hobbyists, balloons and blimps, aerial advertising, float planes, emergency responders, and other UAVs may be more likely to be present within typical UAV airspace. A UAV operating autonomously or under the control of an operator must actively avoid interference with other UAVs operating in a common airspace.

Currently, aircraft operating in regulated airspace, such as airspace regulated by the United States' Federal Aviation Administration (FAA) or the European Union's European Aviation Safety Agency (EASA), may be required to be equipped with a Traffic Collision Avoidance System (TCAS) depending the aircraft type and type of operation. TCAS systems are often heavy, expensive, and/or rely on active interrogation of the transponder of an aircraft in the vicinity of the interrogating aircraft. Lighter systems are generally passive and rely on periodic transmission of transponder information from nearby aircraft, thereby only passively preventing an interaction between aircraft in the vicinity of the transmitting aircraft. In some instances, an object may not be equipped with a transponder and therefore would be invisible to passive detection using these techniques. Additionally, in the busiest and most unpredictable airspace, i.e., low altitudes, manned air vehicles typically rely on the pilot and Air Traffic Controllers to prevent interactions and maintain adequate separation between aircraft.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to an unmanned aerial vehicle ("UAV") and systems, devices, and techniques pertaining to a universal identification system for UAVs. The UAV may be used to deliver cargo, e.g., from a fulfillment center to one or more destinations, and may then return to the fulfillment center or other location to retrieve other cargo for another transport to one or more additional destination. The UAV may include a plurality of sensors including, for example, one or more cameras capable of capturing one or more wavelengths of electromagnetic energy including infrared and/or visual, an acoustic sensor (e.g., a microphone, etc.), and/or multispectral sensor for the detection and autonomous avoidance of objects during the UAV's operation. The UAV may also include one or more transmitters, such as an acoustic transmitter. In this regard, the UAV may implement the techniques described in U.S. patent application Ser. Nos. 14/569,125, 14/569,183, and 14/569,233, incorporated by reference in their entirety above, to perform visual, acoustic, and/or multispectral sensing. The UAV may also be equipped with systems for self-identifying using an identifying certificate and dynamic self-management of multiple UAV flight plans to avoid physical interaction among UAVs.

The UAV may transmit its own identifying certificate(s) and/or receive one or more identifying certificates from one or more individual UAVs operating in a common airspace. The UAV may also detect one or more UAVs operating in a common airspace through visual, acoustic, and/or multispectral sensing. Additionally, the UAV may detect physical characteristics of one or more other UAVs operating in the common airspace or one or more operating characteristics of the one or more UAVs operating in the common airspace. An identifying certificate may include a unique identification number associated with the UAV, such as a serial number; the owner and/or operator of the UAV, the UAV's authorization (i.e., license) and/or issuer; validity dates (i.e., first date and last date which the authorization is valid); a list of permitted uses; physical characteristics and operating characteristics of the UAV; and/or a public key fingerprint.

Furthermore, individual UAVs operating within wireless communication range of at least one other UAV may establish and maintain a mesh network for collection and transmission of data representing UAVs operating within the mesh network. Individual UAVs may represent individual nodes on the mesh network for distributing data throughout the network. Additionally, a central authority may represent one or more nodes on the network. For example, the central authority may represent a regulatory authority operating thought an air traffic control tower at one or more airports, or the central authority may be represented by a one or more ground-based or airborne relay stations. Each air traffic control tower and/or relay station may represent an individual node on the mesh network.

In some instances the mesh network may be similar in area or volume as the common airspace 100, however the mesh network may be expanded through individual nodes well beyond the airspace of any individual UAV operating within the mesh network. Moreover, an individual UAV operating on the mesh network, and representing a node of the mesh network, may maintain a local mesh of data associated with one or more UAV(s) operating within the UAV's past, current, and/or future airspace. Associated data may include, for example, physical features, flight characteristics, current location, flight plan(s), digital certificates, and/or an associated timestamp. UAV's operating within a common airspace, or generally within transmission range, may share individual versions of their own local mesh and consolidate received mesh data with local mesh data that is received from nearby UAVs.

A UAV may also communicate with a central mesh data source (e.g., a government authority) through an air traffic control tower, or similar long-rang transmission source. A central mesh data source may share data central mesh data between one or more additional central mesh data source(s) via land based or satellite based transmission methods. Thereby, local data meshes stored on individual UAVs may be shared at much greater distances.

A combination of three or more detection systems may triangulate the location of an unverified object. For example, three UAVs operating within a common airspace or two UAVs and an air traffic control tower. Individual UAVs may monitor detected UAVs operating within a common airspace for compliance with local operating restrictions and/or flight certificate requirements transmitted throughout the mesh network via an individual UAV's identifying certificate. Detected UAVs operating in non-compliance may be monitored by a network of UAVs operating within a common airspace and reported to the central authority or agency. Additionally, elements of a UAV's flight certificate requirements may be stored in local and central mesh data and associated with individual UAVs.

In various embodiments, individual UAVs may house a flight management system comprising a processor, one or more sensors, a wireless communication component, a digital certificate database, and computer-readable storage media (CRM) housing a digital certificate decryption/encryption module. The CRM may receive data from the one or more sensors representing the UAV's airspace (e.g., physical characteristics and/or operating characteristics of a detected UAVs, etc.). The CRM may also receive identifying certificates from one or more UAVs operating within the common airspace of the UAV via a wireless communication component. A data analysis module may compare the decrypted identifying certificate with received sensor data to further validate the detected UAV and the identifying certificate provided by the detected UAV based on requirements of a dynamic validation policy.

The dynamic flight plan optimization module may receive data representing the UAV's airspace and determine an optimized flight mode and flight plan. For example, the UAV may maintain its current flight plan, temporarily execute a "track-and-report" mission to track unverified operations of nearby UAVs, or the module may update the UAV's flight plan to minimize interaction with one or more nearby UAVs in the common airspace.

In accordance with one or more embodiments, A UAV may interrogate its physical surroundings to detect other objects operating within a common airspace. Additionally, a UAV may send local mesh data to a central mesh data source and receive central mesh data from the central source. Upon detection of one or more UAVs within the common airspace, a UAV may request identification from the one or more other unverified UAVs. Upon receipt of an identifying certificate, a UAV may verify the authenticity of the certificate using digital decryption methods and comparison of physical characteristics and operating characteristics of the individual UAV with data provided by in the identifying certificate. A UAV may then update its own local mesh with collected data associated with the individual UAV such as physical features, flight characteristics, current location, flight plan(s), digital certificates, and/or an associated timestamp with each piece of data within the mesh. If necessary, a UAV may update its flight plan or flight mode as a result of the detected and/or received data.

In some embodiments, a UAV may request an identifying certificate from a detected UAV within a common airspace. The UAV may wait a threshold period of time for receipt of the identifying certificate. Failure to provide an identifying certificate may result in the UAV reporting the unverified activity to a central data source. Upon receipt of the identifying certificate, the UAV may validate the certificate and compare data received with the certificate and physical and operating characteristics detected by the UAV and associated with the nearby UAV. The UAV may log received and detected data in the UAV's local mesh and report data to a central authority for incorporation into a central mesh data, including physical and operating characteristics of the nearby UAV, validity results of the received identifying certificate, etc.

In additional embodiments, the local and central mesh data points may be associated with a confidence value. For instance, a central computing resource may receive one or more local mesh datum from individual UAVs. The central computing resource may create a composite, or central mesh, of the data representing all UAVs operating within a predetermined airspace. The central computing resource may compare individual data points and timestamps associated with individual data points to determine and assign a confidence value to the individual data points and/or associated with individual UAVs. The confidence value may be associated with central mesh data and distributed to individual UAVs within the mesh network over a wireless communication network or transmitted directly to UAVs operating within transmission range.

In some embodiments, A UAV may be required to participate in automated flight plan management with one or more UAVs operating within a common airspace. For instance, a UAV may detect one or more nearby UAVs operating within the common airspace. The UAV may determine the proximity of individual nearby UAVs and receive flight plan data from the one or more nearby UAVs. The UAV may compare its own flight plan with the flight plan of individual nearby UAVs and confidence values associated with the flight plans to iteratively negotiate updated flight plans for the individual UAVs. For instance, a UAV may be given priority if a mission urgency factor is higher than a nearby UAV, or a UAV may be given priority if it is tracking a rogue UAV. Additionally, a UAV may be given priority if its operational capabilities (trajectory change, speed range or altitude range, etc.) do not facilitate rapid enough trajectory changes to effectuate a required flight plan change. Individual UAVs may update and execute their own flight plans as a result of the iterative negotiations.

In further embodiments, a network of UAVs may assign one or more UAVs operating within the network, or a predetermined range, to a "track" mode to track and report the activity of unverified or unverified UAVs and/or flying objects. For example, a UAV may detect one or more UAVs operating within a common airspace and request identifying credentials from the nearby UAV. The UAV may determine that the nearby UAV is unverified or non-verifiable. The UAV may notify the central computing resource directly or via the UAV network. The central computing resource may then assign one or more UAVs operating within the common airspace of the unverified UAV to a "track" mode. Individual UAVs may negotiate the "track" assignment based on factors such as proximity to the unverified UAV, fuel capacity, mission urgency, and/or global availability of UAVs, for example.

A "tracking" UAV may detect a disengage event from the unverified UAV, such as transmission of a verifiable identifying certificate, compliance with certificate requirements (altitude, speed, etc.), or landing, for example. On detection of a disengage event, the tracking UAV may disengage and resume its prior mission. Alternatively, the tracking UAV detect that the unverified UAV is operating beyond the tracking UAV's capabilities (i.e., an operational limit such as a maximum authorized altitude, speed, distance from charging station, or travel outside of a predetermined range such as a virtual fence). Under one of these example circumstances, the tracking UAV may renegotiate its "track" assignment and the "track" assignment may be handed off to a second UAV.

The techniques, apparatuses, and systems described herein may be implemented in a number of ways. Example implementations are provided below with reference to the following figures.

Figure 1:
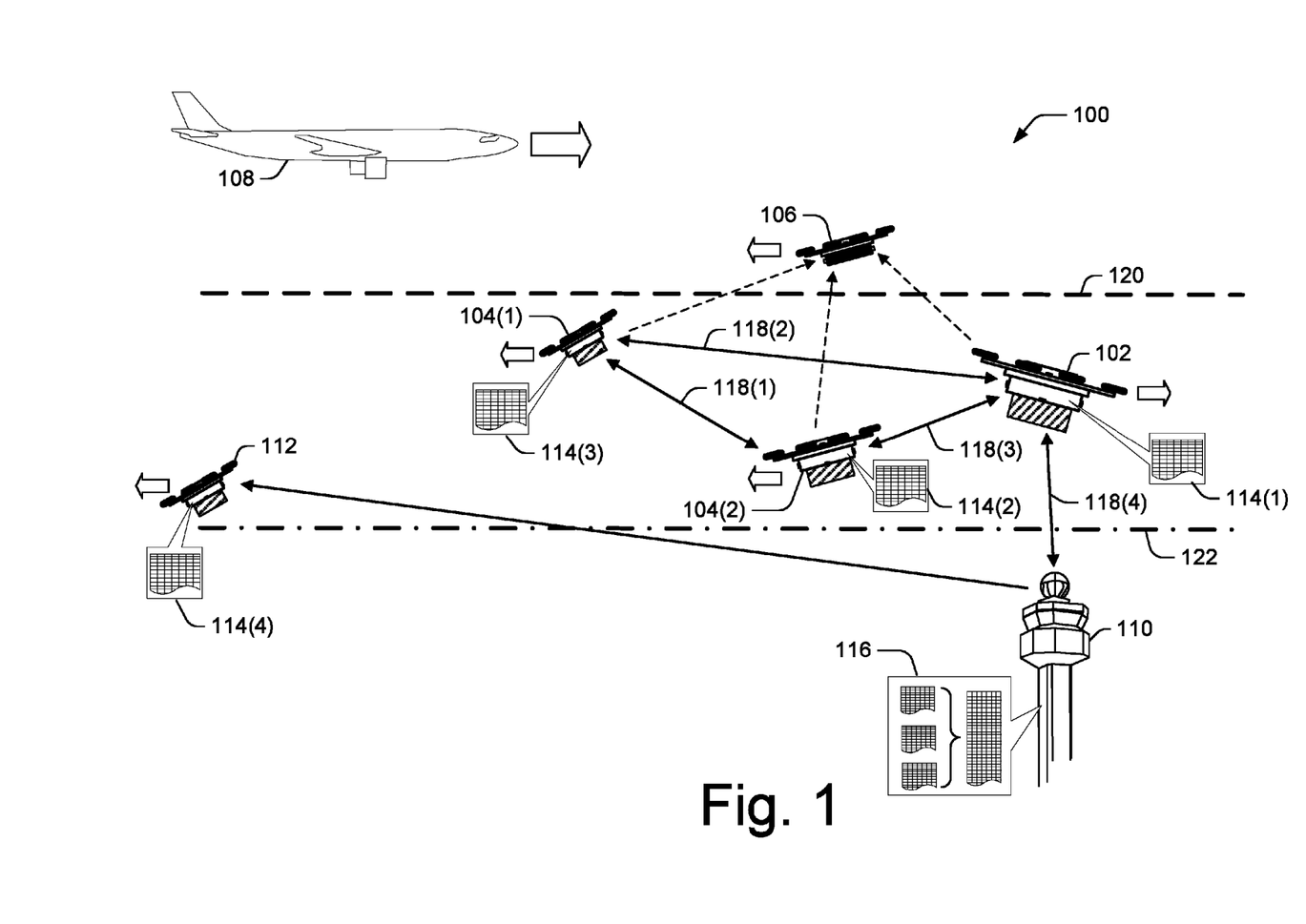
FIG. 1 is a schematic diagram of an illustrative unmanned aerial vehicle (UAV) airspace comprising one or more verified UAV(s) and/or objects operating in a common airspace with an unverified UAV.

FIG. 1 is a schematic diagram of an unmanned aerial vehicle (UAV) 102 operating in an illustrative airspace 100 and comprising one or more verified UAV(s) 104, one or more unverified UAV(s) 106, and/or one or more aircraft 108 operating in the common airspace 100. The airspace 100 may be, for example, the airspace between the UAV's base location and one or more destination locations. The UAV's airspace 100 may also include airspace associated with UAV loading (i.e., where the UAV loads a payload for delivery, tack-off, and/or delivery). The relative position of the one or more aircraft 108, the one or more nearby verified UAV 104, and nearby unverified UAVs 106 is not limiting, and thus they may be at any location relative to the UAV 102 within the UAV's airspace 100.

Individual UAVs operating within the airspace 100, a central control tower (representing a central authority such as the FAA or EASA) 110, and one or more UAVs operating within transmission distance 112 of the central control tower 110 may act as individual nodes and create a mesh network to relay data throughout the mesh network. Individual nodes may also be represented by individual ground based relay stations, other aircraft operating in the airspace 100 (e.g., commercial aircraft, helicopters, etc.), UAV refueling stations (or similar UAV support station), etc. Each node on the mesh network may maintain a local mesh data 114. Local mesh data 114 may be aggregated, or merged, at the central authority 110 into a central mesh data 116. Individual UAVs may establish wireless communication connections 118 to send and receive data, including local 114 and central 116 mesh data, between individual nodes of the mesh network (i.e., individual UAVs 104 or the central authority 110).

Moreover, the central authority 110, may transmit and receive central mesh data 116 over greater distances over wired communication networks or through satellite systems.

Moreover, a central authority 110, may transmit the central mesh 116, or a portion thereof, based at least in part on the location of the receiving node. For instance, a central mesh 116, may contain data representing one or more of a national airspace (e.g., regulated airspace over the continental United States), a regional airspace (e.g., data representing a Pacific Northwest region including, for example, Oregon, Idaho, and Washington State), or a local airspace (e.g., data representing the Seattle metropolitan area). However, based on the receiving UAV's 102 current flight plan, mission, fuel load, or location, for example, only a portion of the central mesh 116, may be transmitted. For instance, a UAV 102 operating in the Seattle metropolitan area may only need data representing that area to effectively manage the UAV's flight plan. Consequently, the central mesh may extract or truncate the central mesh data 116 prior to transmitting the data to the UAV 102. Minimizing the data distributed throughout the mesh network thereby minimizes data transmission times, local UAV data storage requirements, and UAV processor requirements.

Additionally, an external UAV 112 may be operating outside of the transmission range of individual UAVs operating within the mesh network, but the UAV 112 may be within the transmission range of the central authority 110. The external UAV 112 may receive a central mesh 116 from the central authority 110 representing the data collected by the mesh network. In some circumstances where the distance of the external UAV 112 from a node of the mesh network exceeds the transmission distance of the external UAV 112, the external UAV 112 will continue to generate local mesh data 114(4) and transmit the local mesh to one or more other nodes of the mesh network when the external UAV 112 is within transmission range of a mesh node.

A UAV 102 may rely on their local 114 and central mesh 116 data representing one or more of past, present, and future conditions of the airspace. For instance, a UAV 102 having local mesh 114(1) may detect and identify, using an identifying certificate received from the nearby UAV 104(1), the nearby UAV 104(1). Furthermore, the UAV 102 may associate the nearby UAV 104(1) with unique identifier "J7H5F12" based on local 114 and central 116 mesh data held locally on UAV 102. The mesh data may contain information associated with J7H5F12's current and prior location, speed, trajectory, and flight plan, for example. UAV 102 may anticipate the future location of J7H5F12 based on current and prior data associated with UAV J7H5F12 and log anticipated values (such as location, speed, trajectory, etc.) in the local mesh 114, the future data being associated with J7H5F12 in the local meh 114. The future data may be discarded or amended base on later collected data by the UAV 102 or any other node within the mesh network.

Furthermore, the airspace 100 may include a virtual fence representing a three-dimensional volume, or at least an upper altitude limit 120 and/or a lower altitude limit 122. The upper 120 and lower 122 altitude limits may be determined by local operating regulations (i.e., FAA or EASA) for individual UAVs operating within the airspace 100. For example, the United States Federal Aviation Administration (FAA) may restrict operation of the UAV 102 to a maximum altitude, speed, a maximum distance from the operator, within line of sight from the operator, or within a certain classification of controlled or uncontrolled airspace, for example.

Individual UAVs may actively interrogate the airspace 100 to detect both aircraft 108 and other nearby verified UAVs 104 or unverified UAVs 106 operating within the airspace 100. In this regard, the UAV 102 may implement the techniques described in U.S. patent application Ser. Nos. 14/569,125, 14/569,183, and 14/569,233, incorporated by reference in their entirety above. Individual UAVs may use data collected and representing the airspace 100 surrounding the UAV 102 to determine physical characteristics or operating characteristics of nearby UAVs. For instance, a UAV may detect a number of rotors associated with a detected UAV, a feature of a coating of the nearby UAV, or some other physical feature. Additionally, a UAV may monitor the activity of a nearby UAV to associate operating characteristics (i.e., performance parameters) with the nearby UAV. For instance, the UAV may associate a speed or trajectory with the nearby UAV, an operating altitude, assent or decent rate, etc. with the nearby UAV.

A detected UAV failing to provide identifying information (i.e., an identification certificate) and/or failing to comply with one or more features of its identifying information may be considered an unverified UAV 106 by a UAV on the mesh network. For instance, a UAV 102 may detect an unverified UAV 106 operating within a common airspace 100. The UAV 102 may request an identifying certificate from UAV 106 and wait a predetermined amount of time for transmission of the identifying certificate from UAV 106. Concurrently, or subsequently, the UAV 102 may detect physical characteristics and operating characteristics associated with the unverified UAV 106 and log the data in the UAV's 102 local mesh 114(1). Data associated with the unverified UAV 106 may be later associated with an identifying certificate by another node of the mesh network and verified by the other node, or transmitted the UAV 102 and verified. Unverified UAVs 106 may result in assignment of a "track" mode to one or more UAVs of the mesh network as described in more detail with respect to FIG. 7.

Furthermore, a UAV 106 may be determined to be unverified by a UAV 102 of the mesh network as a result of noncompliance with one or more features of the UAV's 106 identifying certificate. For instance, the identifying certificate may include a flight authorization describing airspace in which the UAV 106 is permitted to operate, and or maximum operating characteristics (e.g., speed, acceleration, etc.). Detection, by one or more UAVs of the mesh network, of a deviation of the UAV 106 from one or more of the features of the identifying certificate may result in the unverified status of UAV 106. Additionally, the noncompliance may be reported to the central authority and logged in the central mesh.

Figure 2:
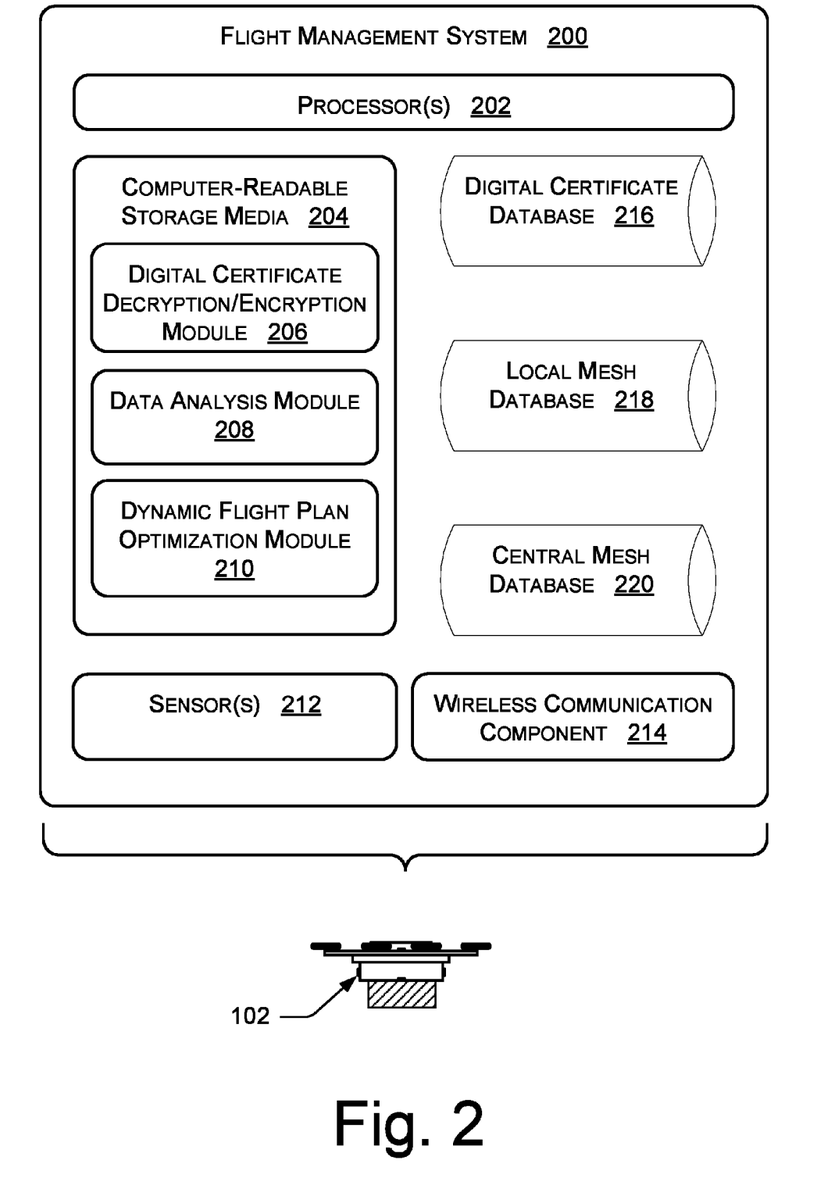
FIG. 2 is a block diagram illustrative of a UAV's flight management system comprising a processor, computer-readable media, one or more sensors, a decryption/encryption module, digital certificate database, and wireless communication component.

FIG. 2 is a block diagram illustrative of a UAV's flight management system 200 comprising a processor 202, computer-readable storage media 204, a digital certificate decryption and encryption module 206, a data analysis module 208, a dynamic flight plan optimization module 210, one or more sensors 212, a wireless communication component 214, and one or more databases including a digital certificate database 216, a local mesh database 218, and a central mesh database 220. The flight management system 200 is described with reference to FIG. 1.

The flight management system 200 maintains and updates the UAV's 102 dynamic flight plan. The onboard processor 202 receives and analyzes a plurality of data from the sensors 212 and the wireless communication component 214 to optimize a dynamic flight plan for the UAV 102. For instance, the UAV 102 may receive an indication of one or more nearby UAVs operating in a common airspace. The UAV 102 may request identification from the one or more nearby UAVs as well as monitor, via the sensors, the physical characteristics and operating characteristics of the one or more nearby UAVs. Further, the UAV's processor 202 may execute one or more modules stored on a computer-readable storage media 204 to analyze received data. For example, a digital certificate decryption and encryption module 206 may decrypt identification data in the form of an identifying certificate received from the one or more nearby UAVs to determine its authenticity. The digital certificate may include features including, for example, an identification number associated with the UAV, such as a serial number; the owner and/or operator of the UAV, the UAV's authorization (i.e., license) and/or issuer; validity dates (i.e., first date and last date which the authorization is valid); a list of permitted uses; physical characteristics and operating characteristics of the UAV; and/or a public key or public key fingerprint (or similar data encryption means). Data received from the UAV's identifying certificate may be stored in a digital certificate database 216. Additionally, features of the identifying certificate and any detected physical characteristics or operational characteristics of individual ones of the one or more nearby UAVs may be stored in the UAV's 102 local mesh database 118 and associated with individual ones of the one or more nearby UAVs.

The data analysis module 208 may compare a combination of data received from an identifying certificate, information contained in the local mesh database, information contained in the central mesh database, and information related to physical characteristics and/or operating characteristics of individual UAVs (verified or unverified) to determine a likelihood of interaction with any detected or self-identified nearby UAV operating within a common airspace 100. Moreover, the data analysis module 208 may receive preflight flight plan data registered with the central authority (e.g., the FAA or the European Aviation Safety Agency, EASA) prior to flight operations. Individual preregistered flight plan data may be associated with individual nearby UAVs or other aircraft 108. The data analysis module 208 may compare the preregistered flight plans, the current operating characteristics of nearby UAVs, and the UAV's 102 own flight plan to determine a likelihood of interaction.

Where the likelihood of interaction exceeds a maximum threshold, the dynamic flight plan optimization module 210 may determine an optimized flight plan that minimizes or eliminates the likelihood of interaction. The UAV 102 may then execute the updated flight plan.

Furthermore, the dynamic flight plan optimization module 210 may consider additional factors, such as fuel capacity, an urgency factor associated with the UAV 102 or flight plans associated with individual ones of the nearby UAVs, relative location of one or more nearby UAVs, external factors (e.g., weather, air traffic congestion, etc.), and/or availability of one or more inactive UAVs within a predetermined distance threshold. The dynamic flight plan optimization module 210 may evaluate one or more flight plans that are alternatives to the current flight plan and iterate the evaluation to determine an optimized flight plan with respect to total flight time, total fuel consumption, impact to the flight plans of one or more other UAVs within the airspace 100, and/or a likelihood of interaction with one or more nearby UAVs. The UAV 102 may then updates its current flight plan to execute the optimized flight plan. Alternatively, the UAV 102 may maintain its current flight plan at a reduced speed in the event that the flight plan optimization module 210 fails to identify a new flight plan. Still further, the UAV 102 may suspend the current flight plan (i.e., mission) to avoid interaction for a determined period of time and resume the flight plan when the likelihood of interaction is determined to be at an acceptable level. Additionally, the UAV 102 log it's most current flight plan in the local mesh database 218 and the UAV 102 may register its most updated flight plan with the central authority 110 by transmitting the updated local mesh database 218 via the wireless communication component 214 to any node on the mesh network. The receiving node on the mesh network may then propagate the most recent flight plan throughout the mesh network.

The flight management system 200 may maintain one or more databases to store data associated with UAVs operating within a common airspace 100 or a common mesh network. For example, identification certificates may be stored in a digital certificate database 216 along with decryption and encryption information (e.g., public keys or public key fingerprints). Additionally, or alternatively, a local mesh database 218 may store individual features associated with an identifying certificate or sensor data representing an individual UAV within the common airspace 100 (e.g., physical characteristics or operating characteristics). Data stored in the local mesh database may be associated with either a verified or unverified UAV operating within the common airspace 100.

Additionally or alternatively, the flight management system 200 may maintain a central mesh database 220 to store central mesh data 116 received from the central authority 110. The flight management system 200 may distribute data throughout the mesh network by either: merging local mesh data with central mesh data and transmitting the updated central mesh data, sending, individually, local mesh data and central mesh data, or sending only local mesh data to be merged by the reviving node (including either another UAV or the central authority). Updated mesh data is intermittently distributed throughout the mesh network to individual nodes of the mesh via the wireless communication component 214.

Figure 3:
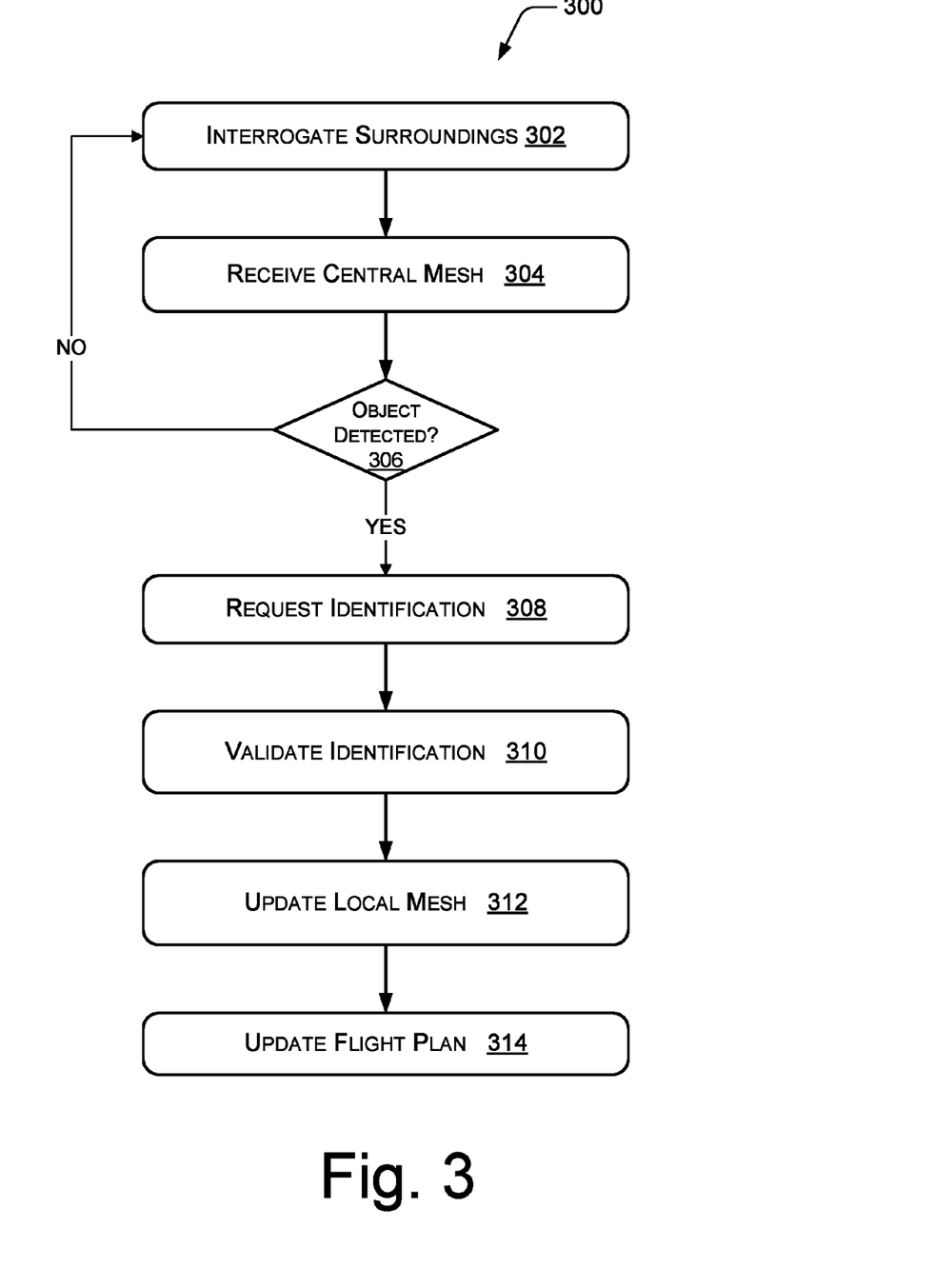
FIG. 3 is a flow diagram of an illustrative process for using a mesh network of UAVs and central control stations for managing a UAV's airspace and maintaining or updating a UAV's flight plan.

FIG. 3 is a flow diagram of an illustrative process 300 for managing a UAV's airspace and maintaining a UAV's flight plan. The order in which the operations are described is not intended to be construed as a limitation, and any number of the described blocks can be combined in any order and/or in parallel to implement the processes. The process 300 is described with reference to FIG. 1.

At a predetermined interval, a UAV 102 may interrogate its surroundings at 302 to determine the presence of one or more nearby UAVs or aircraft 108 operating within a common airspace 100. If no nearby UAVs or aircraft 108 are identified the UAV may maintain its current flight plan and continue periodic interrogation. Furthermore, at 304, the UAV 102 may periodically request and/or receive updated central mesh data 116 from a central authority 110 or one or more nodes of the mesh network. The UAV may process the updated central mesh data 116 to determine the likelihood of interaction with a nearby aircraft 108 or UAV operating within a common airspace 100.

If an object (i.e., nearby UAV or aircraft 108) is detected at 306 the UAV 102 may then request identification from the detected object at 308. The request for identification may include an identifying certificate associated with the detected object. For instance, an identifying certificate, may include at a minimum a unique identifier associated with the detected object such as a serial number. The identifying certificate may also contains one or more of data representing the owner and/or operator of the UAV, the UAV's authorization (i.e., license) and/or authorization issuer; validity dates (i.e., first date and last date which the authorization is valid); a list of permitted uses; physical characteristics and/or operating characteristics associated with the nearby UAV; and/or a public key or public key fingerprint.

The identifying certificate is verified for authenticity at 310. Verification may be conducted by decryption of the identifying certificate using a common public key or a public key or public key fingerprint provided with the identifying certificate. Verification may also require a combination of verification steps according to a dynamic certificate verification policy associated with the identification certificate. For instance, the verification policy may vary in complexity depending on one or more feature of the identifying certificate. For example, a more complex verification policy (i.e., multiple points of verification) may be associated with a UAV having an identifying certificate that includes a flight authorization for a noncommercial flight (i.e., hobbyist) whereas a verification policy associated with a commercial UAV flight authorization may be less complex. In the less complex scenario, validation may only require a relevant decryption key. In the more complex validation scenario, the multiple verification requirement may include cross verification of observed physical and operating characteristics with those included in the identifying certificate, and/or verification of multiple features of the received identifying certificate with one or more copies of local mesh data received from one or more nodes of the mesh network.

The UAV 102 may update its local mesh data with results of the verification processes at 312. Furthermore, the UAV 102 may periodically transmit the updated local mesh data to the one or more nodes of the mesh network for distribution throughout the mesh network. Additionally, the UAV 102 may provide its local mesh data directly to one or more individual nearby UAVs operating in the common airspace.

At 314, the UAV 102 may further compare its own flight plan to that of the detected UAV(s) and update its own flight plan as required to reduce or eliminate the likelihood of interaction between the UAV 102 and the detected UAV(s).

Figure 4:
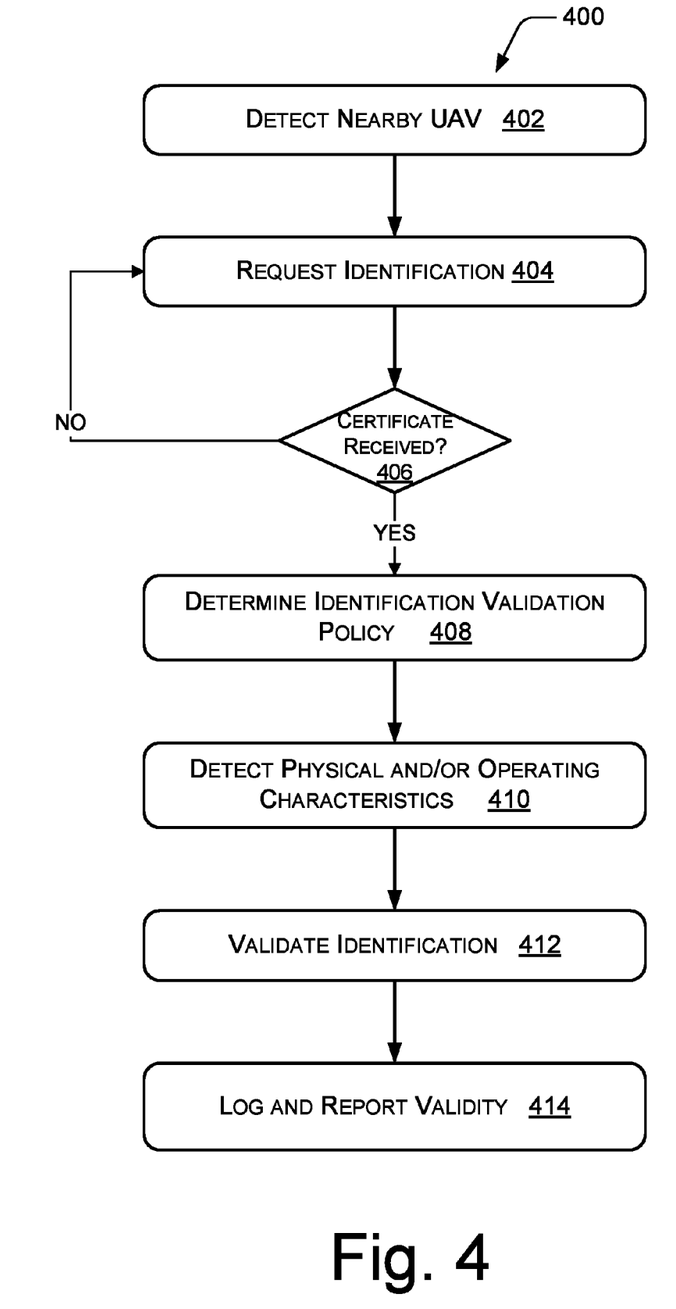
FIG. 4 is a flow diagram of an illustrative process for receiving, verifying, and logging an identification certificate of two more UAV's operating in a common airspace.

FIG. 4 is a flow diagram of an illustrative process 400 for receiving, verifying, and logging an identification certificate of two more UAV's operating in a common airspace 100. The order in which the operations are described is not intended to be construed as a limitation, and any number of the described blocks can be combined in any order and/or in parallel to implement the processes. The process 400 is described with reference to FIG. 1.

At 402 one or more nearby UAVs are detected operating in a UAV's 102 airspace 100. The UAV 102 may requests identification or passively receives a data packet containing a digital identification of the one or more UAVs at 404. The identification may be in the form of a digital identifying certificate. If no identification is received at 406 from a detected nearby UAV, the UAV 102, may wait a threshold period of time and then resubmit the request for identification at 404. If, after a predetermined number of consecutive and unfulfilled requests, the UAV may report the UAV to a central authority 110 via an updated copy of the UAV's 102 local mesh 114, or directly to the central authority 110, for example.

If a digital certificate is received by the UAV 102, from the one or more nearby UAVs 104 operating in the common airspace 100, the UAV 102 determines the digital certificate verification policy to apply to the digital certificate at 408. The complexity of the digital certificate verification policy may be determined to minimize or eliminate the possibility of a UAV operating under an unauthorized certificate. For instance, commercial UAVs operating in a consistent manner in an airspace may require a less complex certificate verification policy relative to a UAV being operated by a hobbyist. This may be accomplished by a unique encryption of the digital certificate held by the commercial UAV operator, or it may be a unique detectable physical characteristic or operating characteristic of the commercial UAV that can be quickly and accurately detected by the UAV 102 to verify the nearby UAV and verify the identifying certificate. For instance, the commercial UAV may have a unique marking and/or a unique coating that is detectable by visual or hyperspectral imaging systems and then associated with a commercial operator type.

Alternatively a noncommercial UAV may require multiple points of verification, including an encryption key associated or included with an identifying certificate. For instance, a noncommercial UAV providing an identifying certificate identifying itself as noncommercial may also be required to provide a decryption key or key fingerprint as well as one or more detectable physical characteristics or operating characteristics associated with the UAV. The UAV 102 may detect the characteristics of the nearby noncommercial UAV to verify the authenticity of the noncommercial UAV's identifying certificate.

The multipoint verification policy of any detected UAV may further include a comparison of the current trajectory of the detected UAV relative to the trajectory provided by the UAV via the digital certificate, and/or a comparison with the a preflight flight plan registered with the central authority 110.

Following the determination of the requisite verification policy at 408, the UAV 102 may detect one or more physical characteristics or one or more operating characteristics associated with the detected UAV at 410. For instance, the UAV 102 may collect data from one or more sensors, the data representing the surrounding airspace 100 and detected UAVs operating within the detection limits of the sensors. The collected data may by analyzed to determine a UAV's physical characteristics and/or operating characteristics.

As discussed above, with respect to FIG. 3 and in view of the determined UAV verification policy at 408, the UAV 102 may validate the identifying certificate at 412. The UAV 102 may compare collected data may relative to information contained in the detected UAV's digital certificate, the UAV's 102 local and central mesh database, and any updated central mesh data received from one or more nodes of the mesh network to validate the detected UAV's identification. For instance, the UAV 102 may compare a flight plan provided as a feature of an identifying certificate provided by the detected UAV to the flight plan associated with the detected UAV in the UAV's 102 local mesh database 114(1). If the detected UAV is maintaining a trajectory in compliance with the fight plan of the local mesh database, the data point is validated. Depending on the determined identification verification policy at 408, one or more data points may need to be validated prior to validating the identifying certificate. For instance, a score may be associated with the validation of individual data points and the validation policy may require a minimum or threshold total score (determined by aggregating the score of individual data points) prior to validating the identification of the detected UAV at 212.

At 414, the UAV 102 then updates its local mesh 114(1) with results of the validation, received and analyzed sensor data relative to any detected UAVs, and transmits the updated local mesh to the central authority and/or to any other node on the mesh network that is within range. The central authority may merge any received local mesh 114(1) with a central mesh 116 to create an updated central mesh version for transmission to nodes of the mesh network.

Figure 5:
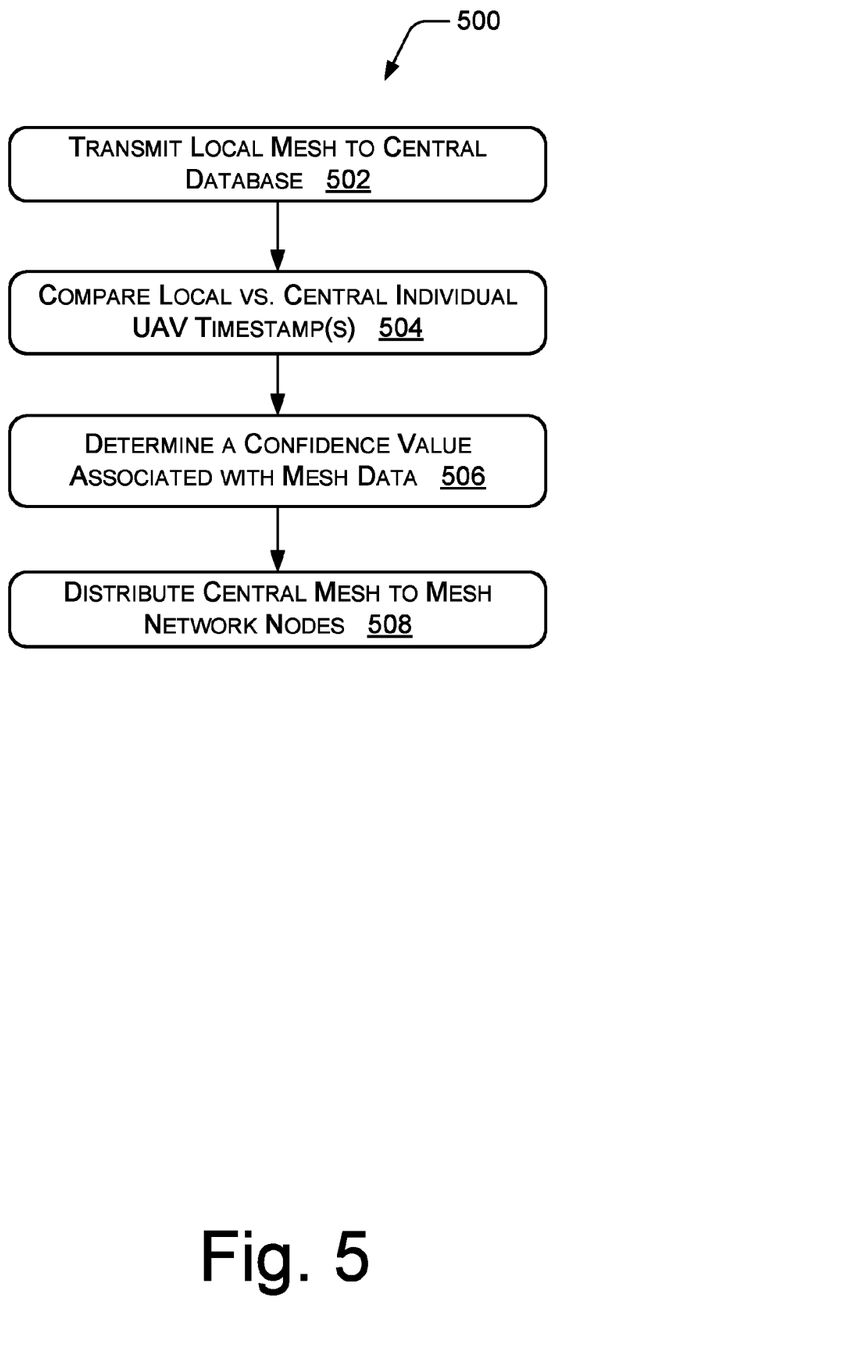
FIG. 5 is a flow diagram of an illustrative process for receiving, managing, and distributing a local and central mesh to one or more UAV's operating in a common airspace region.

FIG. 5 is a flow diagram of an illustrative process 500 for receiving, managing, and distributing a local 114 and central 116 mesh to one or more UAV's operating in a common airspace 100. The order in which the operations are described is not intended to be construed as a limitation, and any number of the described blocks can be combined in any order and/or in parallel to implement the processes. The process 500 is described with reference to FIG. 1.

At 502, the central authority 110 may receive a local mesh 114 from one or more UAVs operating within a mesh network of UAVs. This may include UAVs operating within a common airspace 100 as well as UAVs operating external to the common airspace 112, where local mesh data is received via a land-based or satellite data transmission from a central authority outside of the range of the mesh network.

Local mesh data received at the central authority 110 from individual UAVs operating on the mesh network at 504 and compared to current mesh data 116 stored at the central authority 110. Local mesh data 114 may be merged with central mesh data 116 to maintain an up-to-date central mesh containing data representing active UAV operations within the common airspace 100 or the mesh network. The central mesh 116 may include data associated with individual UAVs, including physical characteristics, operating characteristics, current and estimated location, registered flight plan(s), digital certificates, and/or timestamps associated with individual data points and/or individual local mesh datasets 114 associated with an individual UAV.

At 506, an individual UAVs and/or the central authority 110 may determine a confidence value associated with individual data points within the merged central mesh 116, and/or a confidence value associated with individual data points or subsets of data associated with individual UAVs held within the central mesh 116. Individual confidence value may be determined based in part on the staleness of individual data points within the central mesh 116 based on the timestamps associated with the data. Moreover, confidence values associated with any dataset may be determine, at least in part, on the aggregated confidence values associated with the individual data points and associated with a common UAV.

The updated central mesh 116 may then be distributed to nodes of the mesh network (i.e., individual UAVs) at 508. The central authority 110 may send a portion of the central mesh 116 based on the location of individual UAVs within the mesh network. Additionally, any UAV of the mesh network may truncate central mesh data 116 received from a node of the mesh network. The mesh network may propagate the updated central mesh 116 throughout the mesh network via distribution to individual nodes of the network. Moreover, the central authority 110 may distribute the central mesh 116 to regional or national locations external to the airspace 100 to facilitate handoff of UAV operation between airspace regions.

Figure 6:
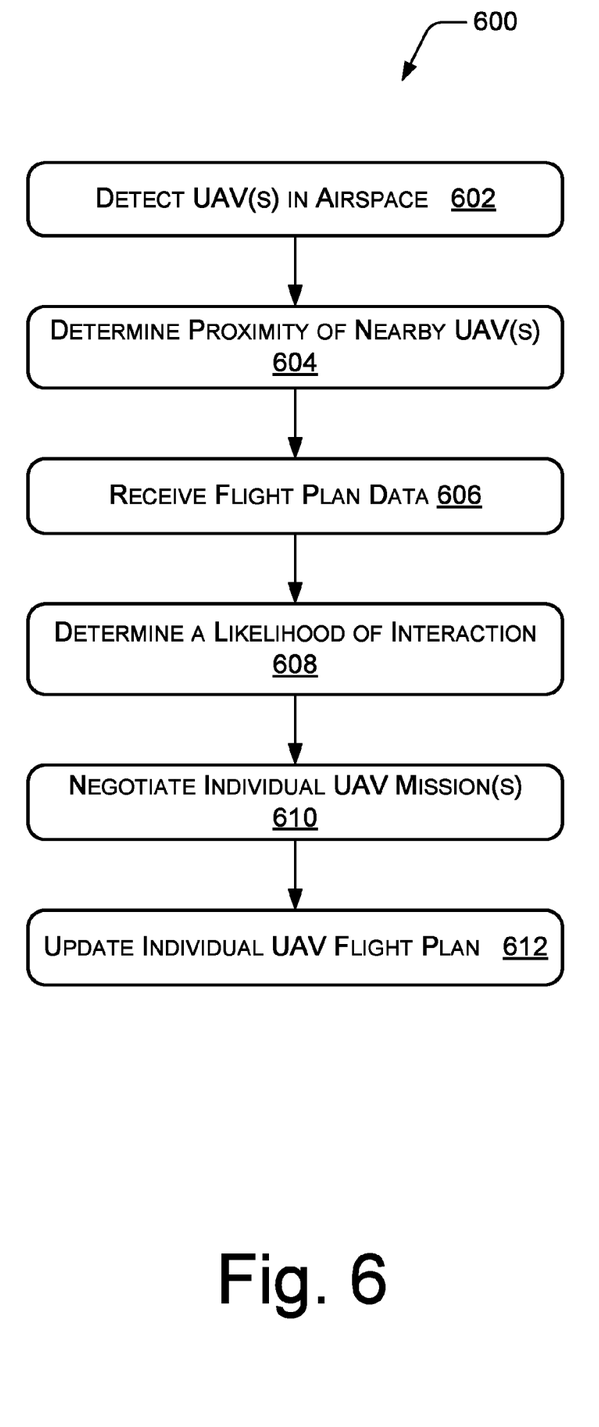
FIG. 6 is a flow diagram of an illustrative process for automated management of individual UAV flight plans.

FIG. 6 is a flow diagram of an illustrative process 600 for automated management of individual UAV flight plans. The order in which the operations are described is not intended to be construed as a limitation, and any number of the described blocks can be combined in any order and/or in parallel to implement the processes. The process 600 is described with reference to FIG. 1. Process 600 may occur at a predetermined interval throughout the flight of the UAV 102. Process 600 may also be triggered by one or more nearby UAVs being detected by the UAV 102 and determined to be operating within a predetermined range such that evasive maneuvering may be required to reduce or eliminate a likelihood of interaction between the UAV 102 and the nearby UAV.

At any point in the illustrative process 600 the UAV 102 may send its local mesh data to a nearby UAV or the central authority or may receive information from the local mesh 114 of a nearby UAV or a central mesh 116 from the central authority 110 (i.e., send and receive from one or more nodes of a mesh network). Two or more UAVs operating within a common airspace may automatically negotiate an optimized flight plan with the greatest likelihood of avoiding interaction between UAVs or other aircraft 108 operating within a common airspace 100.

For instance, at 602 a UAV 102 may detect one or more nearby UAVs operating in a common airspace 100. The UAV 102 may determine the relative proximity of any of the detected UAVs within the airspace 100 at 604 using rang finding techniques and data contained in the UAV's 102 local mesh 114 or a mesh data received from the nearby UAVs and/or the most recent central mesh data 116 received from the central authority 110. The UAV 102 may also receive a flight plan associated with the one or more nearby UAVs from mesh data or directly from the nearby UAV in the form of an identifying certificate at 606.

The UAV 102 may then compare the flight plan data associated with the nearby UAV with its own current flight plan at 608 to determine a likelihood of interaction between the UAV 102 and the detected nearby UAV. Furthermore, the UAV 102 may compare confidence values associated with individual data points in its local 114(1) and central 116 mesh data, as well as confidence values associated with individual UAVs in order to determine a likelihood of interaction with one or more of the detected nearby UAVs. In some circumstances where low confidence values are associated with a detected UAV's flight plan, the UAV 102 determine an unknown likelihood of interaction therefore maintaining a further distance between the UAV's 102 flight plan and the detected UAV in order to ensure that there is no interaction between the two UAVs. For example, a low confidence value may suggest that there is only stale data from which the UAV 102 may determine an accurate likelihood of interaction. A conservative approach leads to maintaining a wide separation distance between the current position of the nearby UAV and the detected UAV's expected flight path.

A UAV 102 may further negotiate the priority of individual UAV missions at 610. For example, a UAV may assign a priority score to individual missions associated with a UAV 102 as well as individual missions associated with UAVs throughout the mesh network. Priority scores may be included in mesh data distributed throughout the network. The priority score may factor in the mission urgency based on mission variables such as a "track-and-report" assignment (as discussed in detail with respect to FIG. 7). Furthermore, a UAV may be assigned a higher mission urgency where the UAV's operational capabilities (trajectory change, speed range, altitude range, etc.) do not facilitate rapid trajectory changes necessary to effectuate a required flight plan change. Mission urgency may also factor in fuel loads of individual UAVs, distance to a recharging station, the availability of replacement UAVs within the mesh network to carry on a failed mission, etc. Conflicts that cannot be resolved between individual UAVs may resort to a default hierarchy rating based on date of manufacture, flight certificate issue date, or some similar comparable parameter that is external to the current mission variables.

Based at least in part on the comparison of the individual flight plans associated with the UAV 102 and one or more nearby UAVs, the confidence value associated with each flight plan, and the negotiated priority of each flight plan or mission, the UAV 102 may determine an optimized flight plan and update the UAV's flight plan in the local mesh 114(1) to be distributed throughout the mesh network at 612.

Figure 7:
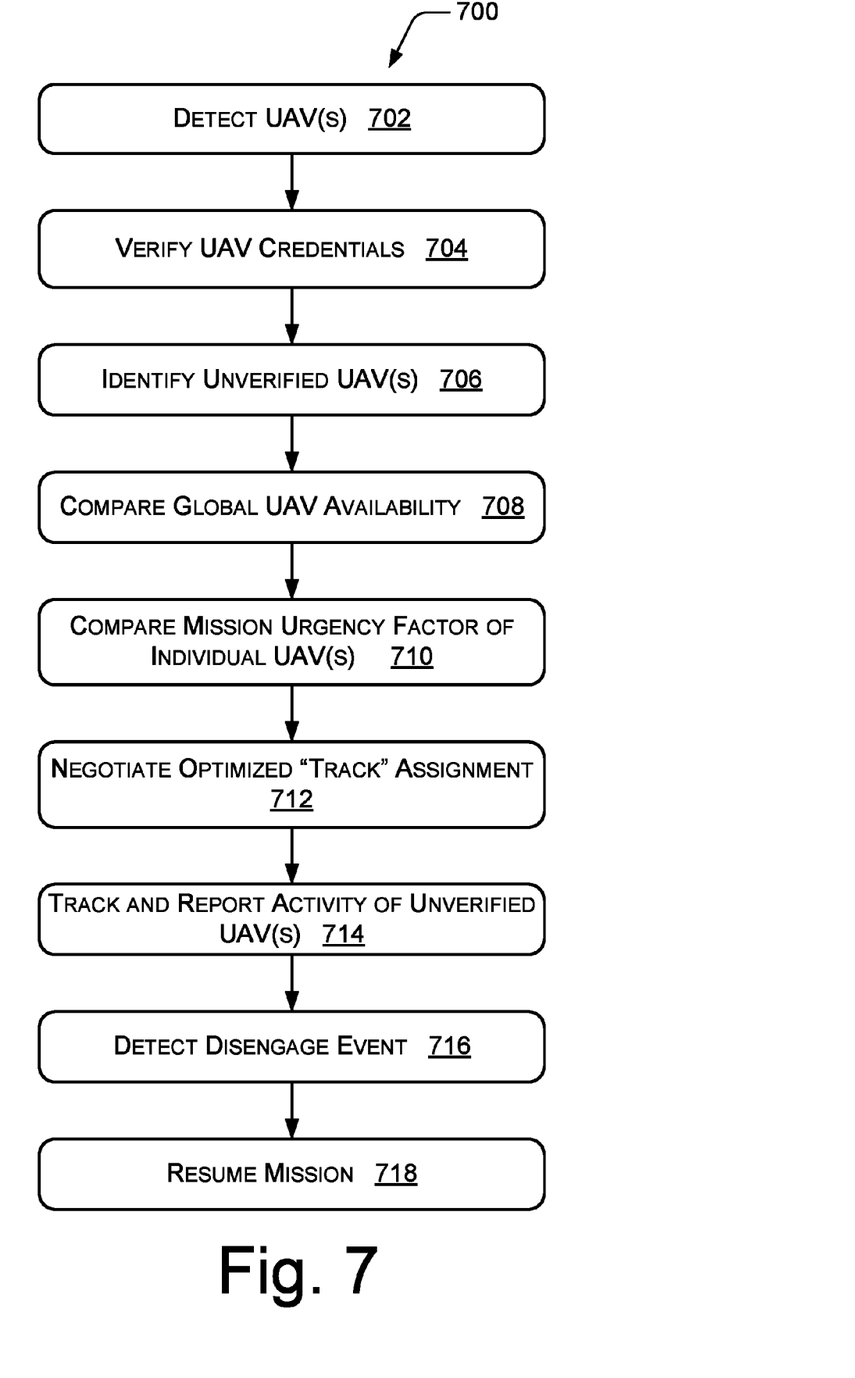
FIG. 7 is a flow diagram of an illustrative process for automated self-policing of two or more UAV(s) operating in a common airspace.

FIG. 7 is a flow diagram of an illustrative process for automated self-policing of two or more UAV(s) operating in a common airspace 100. The order in which the operations are described is not intended to be construed as a limitation, and any number of the described blocks can be combined in any order and/or in parallel to implement the processes. The process 700 is described with reference to FIG. 1. Illustrative process 700 may be conducted by an individual UAV operating within the mesh network or at a location representing the central authority.

A UAV 102, for example, may detect one or more nearby UAVs operating within a common airspace 100 at 702. The UAV 102 may receive and verify identifying credentials, such as an identifying certificate, received from the nearby UAV at 704. The UAV 102 may also detect physical characteristic and/or operating characteristics of the one or more nearby UAVs and compare detected characteristics with the UAV's 102 local and central mesh data to attempt to identify the nearby UAV and/or verify the nearby UAV's identifying certificate according to a verification policy.

The UAV 102 may positively identify the nearby UAV as an unverified UAV at 706 where, for example, the unverified UAV fails to transmit an identifying certificate, or transmits an identifying certificate that cannot be verified by the requisite verification policy. Additionally a positive identification of an unverified UAV may result when the UAV 102 receives a verifiable identifying certificate, but where the nearby UAV is operating outside of authorized parameters (e.g., altitude above or below allowable, speed greater than allowable, etc.).

The UAV 102 detecting the unverified UAV may then report the positive identification to the mesh network, via an updated local mesh 114(1), and determine the global availability of UAVs within the mesh network at 708. Availability may include UAVs undergoing current missions, or idle UAVs, for example. The UAV 102 may compare the mission urgency associated with individual UAVs determined to be within the global UAV network. The UAV 102 may also consider factors such as proximity of individual UAVs within the network, fuel capacity, or other mission variables to determine one or more UAVs capable of a "track-and-report" assignment. The UAV 102 may also consider external factors such as weather (rain, head/tail wind, etc.), and/or airspace congestion, for example.

The UAV 102 may then negotiate an optimized "track-and-report" assignment with individual UAVs within the network and assign one or more UAV to "track" the unverified UAV at 712.

The UAV with the "track" assignment may constantly monitor the activity of the unverified UAV and maintain a predetermined distance from the unverified UAV at 714. The "tracking" UAV will continuously, or at predetermined intervals, report activity of the unverified UAV to the mesh network, including the central authority. The "tracking" UAV may log the detected activity of the unverified UAV in the local mesh of the "tracking" UAV and propagate the information through the mesh network to provide visibility of the unverified UAV's activities to all UAVs operating within a common airspace 100 or patriating in the common mesh network.

The tracking assignment continues until the tracking UAV detects a disengage event at 716. A disengage event may include detecting the unverified UAV lands, verifying the unverified UAV's identifying certificate, or the unverified UAV departing from the authorized flight parameters of the tracking UAV. For instance, the unverified UAV may ascend or descend to an altitude outside of the approved flight envelop of the tracking UAV. Additionally or alternatively, the unverified UAV may accelerate to a speed that is unauthorized by the tracking UAV. The disengage event may also be the result of the unverified UAV operating beyond the authorized flight certificate of the UAV (i.e., the flight authorization provide by a central authority such the FAA or EASA). The tracking UAV may report a disengage event and determine an optimized replacement UAV to resume track-and-report assignment. Upon disengagement, the tracking UAV may resume its prior mission 718.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A first unmanned aerial vehicle (UAV) comprising:
   one or more processors;
   one or more sensors to capture signals providing a representation of an airspace at least partially surrounding the first UAV; and
   memory to store computer-readable instructions that, when executed, cause the one or more processors to perform acts including:
      detecting, from signals generated from the one or more sensors, a second UAV at a location in the airspace at least partially surrounding the first UAV;
      determining an identifier associated with the second UAV;
      sending, to at least one of another UAV or a central authority, a notification that includes at least the identifier and the location of the second UAV to update a mesh network that tracks aircraft in at least the airspace; and
      receiving data associated with the mesh network, the data indicating at least a different location of a third UAV in the airspace.

2. The first UAV of claim 1, wherein the acts further comprise:
   determining whether the second UAV is authorized to operate in the airspace based at least in part on the identifier associated with the second UAV; and
   indicating, in the mesh network, an authorization status of the second UAV based on whether the second UAV is authorized to operate in the airspace.

3. The first UAV of claim 1, wherein the mesh network includes nodes that represent at least one of other aircraft or obstacles in the airspace, and wherein the acts further comprise:
   determining a likelihood of physical interaction between the first UAV and individual objects associated with the nodes of the mesh network based at least in part on the data associated with the mesh network; and
   generating a flight plan based at least in part on the mesh network to avoid physical interaction between the first UAV and the individual objects associated with the nodes of the mesh network.

4. The first UAV of claim 1, wherein the mesh network include past location data for at least one of the second UAV and the third UAV, and wherein the acts further comprise:
   estimating a future flight path for at least one of the second UAV or the third UAV based at least in part on the past location data; and
   representing the future flight path in the mesh network.

5. The first UAV of claim 1, wherein the mesh network includes an indication that the third UAV is an unverified UAV that is unassociated with a recognized identifier; and wherein the acts further comprise representing the second UAV as verified and the third UAV as unverified in the mesh network.

6. The first UAV of claim 1, wherein the acts further comprise updating the mesh network to include representations for at least the first UAV, the second UAV, and the third UAV and corresponding location information prior to transmitting the mesh network to a fourth UAV or to the central authority.

7. A method comprising:
   detecting, from signals generated from sensors onboard a first unmanned aerial vehicle (UAV), a second UAV at a location in an airspace at least partially surrounding the first UAV;
   determining an identifier associated with the second UAV;
   populating a mesh network with at least the identifier and the location of the second UAV, the mesh network to track aircraft in at least the airspace;
   transmitting, to at least one other UAV, a notification that includes at least the identifier and the location of the second UAV.

8. The method of claim 7, further comprising:
   receiving, from a third UAV, location information of a fourth UAV in the airspace; and
   populating the mesh network to include information associated with a presence of the third UAV, the fourth UAV, or both in the airspace.

9. The method of claim 7, further comprising:
   populating the mesh network with information associated with the first UAV; and
   transmitting the mesh network to a central authority.

10. The method of claim 7, further comprising determining whether the second UAV is authorized to operate in the airspace based at least in part on the identifier associated with the second UAV.

11. The method of claim 7, wherein the mesh network includes nodes that represent at least one of other aircraft or obstacles, and wherein the acts further comprise generating a flight plan associated with the first UAV to reduce a likelihood of physical interaction between the first UAV and individual objects associated with the nodes of the mesh network.

12. The method of claim 7, wherein the mesh network includes past location data for the second UAV, and further comprising:
   estimating a future flight path for the second UAV based at least in part on the past location data; and
   representing the future flight path for the second UAV and a known flight path of the first UAV in the mesh network.

13. The method of claim 7, further comprising validating at least the identifier of the second UAV using a verification policy.

14. The method of claim 7, further comprising:
   determining the second UAV terminates flight, and updating the mesh network to at least one of remove the second UAV from the mesh network or depict the second UAV as stationary.

15. A flight management system comprising:
one or more processors; and
memory to store computer-executable instructions that, when executed, cause the one or more processors to perform acts comprising:
  receiving, from a first unmanned aerial vehicle (UAV), i) location information associated with a second UAV at a second location in an airspace at least partially surrounding the first UAV and ii) a second identifier associated with the second UAV; and
  transmitting, to at least a third UAV, a notification that includes at least some data from a mesh network that tracks aircraft in the airspace, the notification including at least i) a first identifier of the first UAV and a first location of the first UAV and ii) the second identifier of the second UAV and the second location of the second UAV.

16. The flight management system of claim 15, wherein the acts further comprise validating at least the second identifier of the second UAV using a verification policy to determine at least one of a flight plan of the second UAV or an authorization of the second UAV to operate in the airspace.

17. The flight management system of claim 15, further comprising:
  determining a flight plan of at least the first UAV; and
  updating the mesh network to include at least a flight plan of the first UAV.

18. The flight management system of claim 15, further comprising designating, via the mesh network, at least the first UAV as authorized to operate in the airspace based at least in part on the first identifier of the first UAV.

19. The flight management system of claim 15, further comprising determining a first predicted flight path of the first UAV and second predicted flight path of the second UAV based at least in part on the first location and the second location, and including the predicted flight path in the notification transmitted to the third UAV.

20. The flight management system of claim 15, wherein the acts further comprise updating the mesh network to remove a node in response to at least one of:
  detecting that the first UAV or the second UAV lands; or
  detecting that the second UAV travels outside of the airspace at least partially surrounding the first UAV or outside of other airspace surrounding other UAVs that contribute to the mesh network.

* * * * *